United States Patent

Tremblay

[11] 4,011,047
[45] Mar. 8, 1977

[54] SMELT SPOUT FOR RECOVERY BOILER

[75] Inventor: Ronaldo Joseph Tremblay, Windsor, Canada

[73] Assignee: Domtar Limited, Montreal, Canada

[22] Filed: Dec. 5, 1975

[21] Appl. No.: 638,197

[52] U.S. Cl. .......................... 23/252 R; 23/277 R; 23/271 P; 162/240; 266/218

[51] Int. Cl.² .................... B01J 1/00; D21C 11/00

[58] Field of Search ......... 23/277 R, 252 R, 271 P, 23/262; 266/34 T, 215, 217, 218; 162/30 R, 30 K, 240

[56] References Cited

UNITED STATES PATENTS

| | | | |
|---|---|---|---|
| 1,881,228 | 10/1932 | Pape | 23/277 R X |
| 2,498,405 | 2/1950 | Fader | 23/277 R X |
| 3,122,421 | 2/1964 | Gettle | 23/277 R X |
| 3,224,051 | 12/1965 | Brown, Jr. et al | 266/34 T |
| 3,471,263 | 10/1969 | Hojnos et al. | 23/262 X |
| 3,511,490 | 5/1970 | Brown, Jr. | 266/34 T X |

FOREIGN PATENTS OR APPLICATIONS

| | | | |
|---|---|---|---|
| 1,009,634 | 6/1952 | France | 266/215 |
| 12,363 | 9/1886 | United Kingdom | 266/215 |
| 622,419 | 5/1949 | United Kingdom | 266/217 |

Primary Examiner—Joseph Scovronek
Assistant Examiner—Arnold Turk
Attorney, Agent, or Firm—C. A. Rowley

[57] ABSTRACT

A non water cooled smelt spout for a pulp mill chemical recovery furnace. The spout is constructed from insulating and refractory material contained in a metal trough and is provided with a steam jet immediately adjacent the bottom free end of the spout. The jet impairs the formation of slag on the bottom of the trough and disintegrates the smelt stream issuing from the spout. Preferably the steam passage leading to the jet or nozzle extends along the bottom of the spout whereby the steam forming the jet also cools the bottom wall.

2 Claims, 4 Drawing Figures

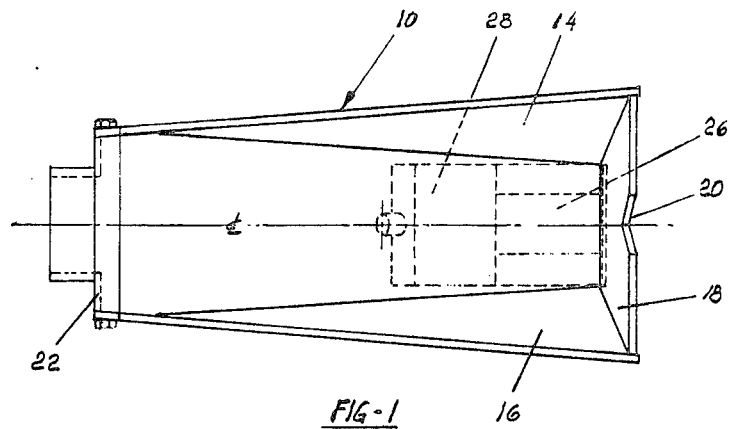
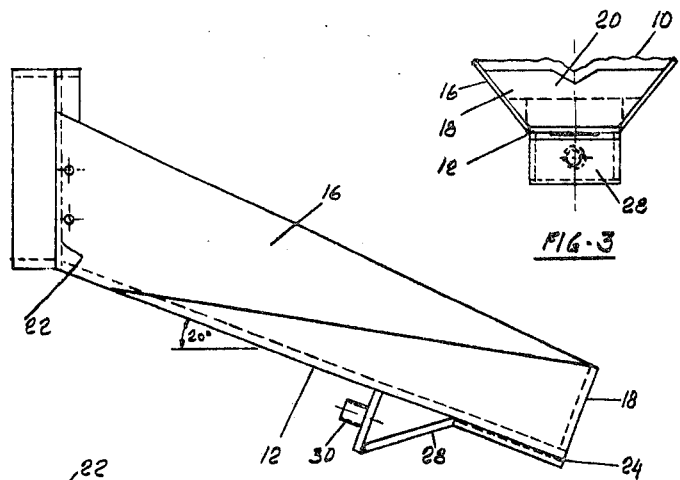
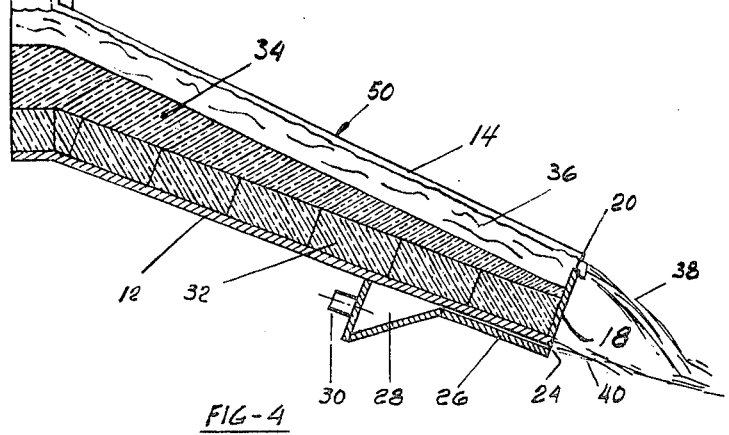

SMELT SPOUT FOR RECOVERY BOILER

The present invention relates to a smelt spout for a recovery boiler. More specifically the present invention relates to a combination smelt spout and shattering steam jet for a chemical recovery furnace such as those used to recover pulping cooking chemical from black liquor in the kraft process.

Recovery of chemical from black liquor in the kraft pulping process normally requires concentrating the used liquor (black liquor) and feeding the concentrated black liquor into, for example, a Tomlinson type furnace wherein the remainder of the water is evaporated and a char composed primarily of sodium sulphate, sodium carbonate and some organics is formed. This char falls to the bed of hearth of the furnace which is maintained under reducing conditions and at a temperature to form a smelt consisting essentially of molten sodium sulfide and sodium carbonate. The smelt pours out of the furnace on a smelt spout and is disintegrated by impinging a steam jet onto the smelt stream so that the smelt enters the dissolving tank as small particles and is dissolved in water.

The smelt stream from the furnace is at about 1800°–1900° F and thus care must be taken to protect the spout structure from overheating and melting or deteriorating in any way, since the furnace must be shut down if the spout has to be changed. Modern furnaces use what is known as a water cooled spout which generally takes the form of a jacketed metal trough through which water is circulated to cool and protect it from the molten smelt.

Water cooling effectively permits a spout life of normally over about a year, but it also provides a safety hazard. Contact between water and sodium sulfide in the smelt in any appreciable quantity will result in an explosion and extreme care is taken not only in the area of the spout but also within the furnace to ensure that water does not contact the smelt. Water cooling of the smelt spout adds a further source of water that may contact the smelt in the furnace and cause explosions. According to a report of the "Black Liquor Recovery Boiler Advisory Committee" since 1968 there have been two explosions as direct result of water from the smelt spout and five other non-explosive incidents involving water leaking from the spout. Thus in spite of the precautions taken explosions are caused by water escaping from the cooling jacket of a water cooled spout.

As above indicated the smelt after if leaves the spout is disintegrated by means of an impinging jet of steam or the like to reduce the size of the smelt particles contacting the liquid in the dissolving tank. It has been proposed for example in Canadian Pat. No. 567,081 to direct the steam jet down onto the top of the stream of smelt leaving the spout.

It has been contemplated to utilize refractory material to insulate and isolate the metal of the spout from the smelt, however, such attempts have not been particularly successful. The spout life was generally short with failure occuring adjacent the tip or free end of the spout.

At the tip or free end of the smelt spout a so called slag is formed by solidification of the smelt. This solidified smelt or slag projects outwardly from the free end of the spout and eventually works its way around on to the bottom of the spout. It has been found that metal deteriorates beneath the slag particularly on the bottom of the spout and it is at this point that failure first occurs.

The present invention eliminates the necessity for water cooling and utilizes the steam jet, not only to disintegrate the smelt stream but also to prolong the life of the smelt spout.

Broadly the present invention relates a smelt spout comprising a metal trough having bottom and side walls, a lining in said trough isolating said smelt from said trough, an end wall formed at the free or front end of said trough, a steam jet means positioned immediately adjacent said bottom wall and directing steam away from said spout to intersect the trajectory of smelt pouring from said spout and disintegrate said smelt.

Preferably said steam jet is connected with a steam chamber positioned on the outside of said bottom wall whereby steam for said jet passes through said chamber and cools said bottom wall.

Further features, objects and advantages will be evident from the following detailed description of the preferred embodiments of the present invention taken in conjunction with the accompanying drawings in which FIG. 1 is a plan view of a metal trough for the spout of the present invention.

FIG. 2 is a side view of the trough of FIG. 1.

FIG. 3 is an end view from the free end of the trough of FIGS. 1 and 2, and

FIG. 4 is a section through the spout of the present invention formed using the trough illustrated in FIGS. 1, 2 and 3.

Referring to FIG. 1, 2 and 3 the trough 10 in which the spout of the present invention is formed has a bottom wall 12, a pair of side walls 14 and 16 extending upwardly at an obtuse angle from the opposite sides of the bottom 12 and a plate 18 extending across the free end of the trough 10 and formed with a notch 20 through which the smelt pours. Suitable flanges 22 are provided on the fixed end of the trough 22 for anchoring the trough to the furnace structure. Mounted on the bottom plate 12 adjacent the free end formed by the plate 18 is a nozzle 24 which directs steam outwardly from the free end of the trough. This nozzle 24 is connected via a passage 26 (see FIGS. 1 and 4) extending along the bottom plate 12 and communicating with a manifold 28 having an inlet nipple 30 that may be connected to a suitable source of pressurized steam (not shown).

The trough 10 is used to construct a spout 50. As shown in FIG. 4 the fabricated spout 50 has a layer of insulating brick 32 and a layer of plastic refractory material 34 suitably contoured to obtain a desired slope for pouring of the smelt 36 out the spout 50.

In operation smelt is indicated at 36 in FIG. 4 pours down the spout 50 and issues through the notch 20 formed in the wall 18 to form a stream 38 of smelt. Steam is injected into the chamber 28 via the inlet 30 and passes via passage 26 to issue through the nozzle 24 as a jet of steam 40 which intercepts the trajectory of the steam 38 and disintegrates the smelt into small particles that fall into the water in the dissolving tank without creating a major explosion.

It will be noted that the nozzle 24 is positioned immediately adjacent the bottom 12 of the spout 50 and thus prevents any slag or the like from accumulating on the front wall 18 and running down on to the bottom wall 12 at least in the area of the jet 40. This reduction is slag build up on the bottom wall 12 helps to prolong the life of the spout.

The passage 26 requires that the steam flow in very close proximity to the bottom plate 12. The length of this passage combined with the length of the chamber or manifold 28 in a longitudinal direction of the spout provides time for the steam to contact and cool the bottom plate 12.

It will be appreciated that the plate 18 and the trough 10 will be warmer with the present invention than when water cooled spout is used. It is believed this higher temperature has a beneficial effect as it has been experienced that the slag is much easier to dislodge than with a water cooled spout.

As above indicated the length of the passage 26 or combined length of the passage 26 and the chamber 28, may be adjusted to obtain the desired degree of cooling. It has been found that for a spout approximately three feet long the passage 26 should be about 8 inches long and the chamber 28 about 6 inches long and for a bottom plate 12 about 8 inches wide, the passage 26 should be about 5 inches wide. Obviously the width of the passage also effects the cooling. Preferably the slope of the plate 12 and thus direction of the steam jet 40 will be downward at about 20°.

As above indicated the lengths of the passage 26 and chamber 28 may vary as required to obtain a desired degree of cooling but if no cooling is necessary obviously the chamber 28 and the passage 26 will be as small as possible it being important that the nozzle 26 be positioned immediately adjacent the bottom 12 of the spout 50 to ensure there is a minimum build up of slag on the bottom plate.

Modifications will be evident to those skilled in the art without departing from the spirit of the invention as defined in the apparent claims.

I claim:

1. A smelt spout for a paper pulp mill chemical recovery furnace, said spout comprising a metal trough having a bottom wall, a refractory lining in said trough, means for connecting said trough to said furnace at one end of said trough, said trough at the end opposite said one end terminating in a free end from which a smelt stream flows, nozzle means immediately adjacent to the bottom of said trough and said free end of said trough means for directing steam to said nozzle means, said nozzle means forming a steam jet intersecting the trajectory of said stream of smelt flowing from said spout thereby to disintegrate said stream, said nozzle means being positioned relative to said trough means so that said jet passes immediately adjacent said bottom wall at said free end and impairs the build up of slag formed by solidification of said smelt onto said bottom wall adjacent said free end.

2. A smelt spout as defined in claim 1 wherein said steam supply means comprises a passage in heat transfer relationship with said bottom wall of said trough whereby said steam forming said jet and passing through said passage cools said bottom wall.

* * * * *